(12) United States Patent
Ye

(10) Patent No.: US 9,645,675 B2
(45) Date of Patent: May 9, 2017

(54) TOUCH CONTROL SUBSTRATE, TERMINAL AND METHOD FOR IMPROVING TOUCH PRECISION

(71) Applicant: Shenzhen China Star Optoelectronics Technology Co., Ltd., Shenzhen, Guangdong (CN)

(72) Inventor: Chengliang Ye, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 122 days.

(21) Appl. No.: 14/425,628

(22) PCT Filed: Dec. 9, 2014

(86) PCT No.: PCT/CN2014/093356
§ 371 (c)(1),
(2) Date: Mar. 3, 2015

(87) PCT Pub. No.: WO2016/086433
PCT Pub. Date: Jun. 9, 2016

(65) Prior Publication Data
US 2016/0342274 A1 Nov. 24, 2016

(30) Foreign Application Priority Data
Dec. 3, 2014 (CN) .......................... 2014 1 0728198

(51) Int. Cl.
*G06F 3/041* (2006.01)
*G06F 3/044* (2006.01)
(52) U.S. Cl.
CPC ............ *G06F 3/0418* (2013.01); *G06F 3/044* (2013.01); *G06F 3/0416* (2013.01); *G06F 2203/04104* (2013.01)

(58) Field of Classification Search
CPC .................. G06F 3/0418; G06F 3/044; G06F 2203/04103; G06F 2203/04104;
(Continued)

(56) References Cited

U.S. PATENT DOCUMENTS 8,692,563 B1 * 4/2014 Maharyta ........... G01R 27/2605
  324/658
8,988,378 B2 * 3/2015 Liu ......................... G06F 3/044
  178/18.06
(Continued)

FOREIGN PATENT DOCUMENTS

CN  102023768 A   4/2011
CN  102830882 A   12/2012
(Continued)

*Primary Examiner* — Tom Sheng
(74) *Attorney, Agent, or Firm* — Andrew C. Cheng

(57) ABSTRACT

The present application provides a touch control substrate, terminal and method for improving touch precision. The touch control substrate comprises a logic control module, a touch control module, a first switch control module, a first switch module, a second switch module, a second switch control module and an electrode module. The logic control module is coupled to the first switch control module, the touch control module and the second switch module, respectively. The first switch module is coupled to the first switch control module, the touch control module, the second switch module and the electrode module, respectively. The second switch module is further coupled to the second switch control module, the touch control module and the electrode module. The solution above could eliminate ghost points, improve precision of locating touch points, and is characterized in high scanning speed.

10 Claims, 3 Drawing Sheets

(58) Field of Classification Search
CPC . G06F 2203/04106; G06F 2203/04111; G06F 3/0416
USPC ................................................ 345/174
See application file for complete search history.

(56) References Cited

U.S. PATENT DOCUMENTS

| | | | | |
|---|---|---|---|---|
| 9,069,405 B2* | 6/2015 | Grivna | ............. | G06F 3/0416 |
| 2010/0328262 A1* | 12/2010 | Huang | ............. | G06F 3/0416 |
| | | | | 345/174 |
| 2012/0154324 A1* | 6/2012 | Wright | ............. | G06F 3/0416 |
| | | | | 345/174 |
| 2013/0229382 A1* | 9/2013 | Huang | ............. | G06F 3/044 |
| | | | | 345/174 |
| 2013/0265276 A1* | 10/2013 | Obeidat | ............. | G06F 3/044 |
| | | | | 345/174 |
| 2013/0285971 A1* | 10/2013 | Elias | ............. | G06F 3/044 |
| | | | | 345/174 |
| 2013/0285972 A1* | 10/2013 | Elias | ............. | G06F 3/044 |
| | | | | 345/174 |
| 2013/0285973 A1* | 10/2013 | Elias | ............. | G06F 3/044 |
| | | | | 345/174 |
| 2013/0314109 A1* | 11/2013 | Kremin | ............. | G01R 27/2605 |
| | | | | 324/686 |
| 2014/0145997 A1* | 5/2014 | Tiruvuru | ............. | G06F 3/0416 |
| | | | | 345/174 |
| 2014/0210776 A1* | 7/2014 | Kuroiwa | ............. | G06F 3/0416 |
| | | | | 345/174 |
| 2015/0035549 A1* | 2/2015 | Sugiura | ............. | H03K 17/955 |
| | | | | 324/663 |
| 2015/0145802 A1* | 5/2015 | Yao | ............. | G06F 3/0416 |
| | | | | 345/174 |

FOREIGN PATENT DOCUMENTS

| | | |
|---|---|---|
| CN | I03577008 A | 2/2014 |
| CN | 103995627 A | 8/2014 |

* cited by examiner

TOUCH CONTROL SUBSTRATE, TERMINAL AND METHOD FOR IMPROVING TOUCH PRECISION

FIELD OF THE INVENTION

The present invention relates to a communication technique field, and more particularly to a touch control substrate, terminal and method for improving touch precision.

BACKGROUND OF THE INVENTION

Nowadays, a method for scanning capacitor panel primarily comprises a method of self-capacitance scanning and a method of mutual-capacitance scanning. The self-capacitance scanning is to scan a row electrode and a column electrode simultaneously so as to determine the self-capacitance of the row electrode and the self-capacitance of the column electrode (i.e., to determine the capacitance variation formed between the row electrode and the touching finger or between the column electrode and the touching finger). The mutual-capacitance scanning is to sequentially scan the row electrodes and the column electrodes, respectively, so as to determine the mutual-capacitance between the two electrodes perpendicular to each other (i.e., to determine the capacitance variation at a location of a cross point of the row electrode and column electrode perpendicular to each other in the capacitor panel).

However, for a large scale touch panel, ghost points (i.e., touch points determined by the system in error) would occur from the self-capacitance scanning method when there are two or more touch points on a touch panel having large scale, and the scanning speed is slow when the mutual-capacitance scanning method is applied.

For example, when two points are touched, four touch points would be determined by the system because the self-capacitance scanning method scans the X electrode and Y electrode simultaneously. However, only two of the touch points are real touch points, and another two touch points are ghost points.

The mutual-capacitance scanning method has to scan rows (Y electrodes) sequentially and then scan columns (X electrodes) sequentially, and determines the real touch points according to scan time of the Y electrodes and the capacitance between the X electrodes and the Y electrodes perpendicular to each other. Because the mutual-capacitance scanning method has to scan rows and columns sequentially, time to determine points are long and point reporting is not efficient for a large scale capacitance panel although the touch points obtained by the mutual-capacitance scanning method are real touch points.

SUMMARY OF THE INVENTION

The primary technique problem solved by the present application is to provide a touch control substrate, terminal and method for improving touch precision, so as to eliminate ghost points, improve precision of locating touch points, and is characterized in high scanning speed.

In order to solve the technique problem mentioned above, one technique solution adopted by the present application is to provide a touch control substrate, wherein the touch control substrate comprises a logic control module, a touch control module, a first switch control module, a first switch module, a second switch module, a second switch control module and an electrode module; wherein the logic control module comprises a first output terminal, a second output terminal and a third output terminal, the touch control module comprises a control terminal, a first emitting terminal, a second emitting terminal and a receiving terminal, the first switch control module comprises an input terminal and an output terminal, the first switch module comprises a control terminal, a first input terminal, a second input terminal and an output terminal, the second switch module comprises a control terminal, a first input terminal, a second input terminal and an output terminal, the second switch control module comprises an input terminal and an output terminal; the first output terminal of the logic control module is coupled to the input terminal of the first switch control module, and the output terminal of the first switch control module is coupled to the control terminal of the first switch module; the second output terminal of the logic control module is coupled to the control terminal of the touch control module, the first emitting terminal of the touch control module is coupled to the first input terminal of the first switch module, the second emitting terminal of the touch control module is coupled to the second input terminal of the first switch module, and the output terminal of the first switch module is coupled to a row electrode unit of the electrode module; the third output terminal of the logic control module is coupled to the input terminal of the second switch control module, and the output terminal of the second switch control module is coupled to the control terminal of the second switch module; the first input terminal of the second switch module is coupled to the first input terminal of the first switch module, the second input terminal of the second switch module is coupled to a column electrode unit of the electrode module, and output terminal of the second switch module is coupled to the receiving terminal of the touch control module;

the logic control module emits a first trigger signal to trigger the first switch control module to control to couple the first input terminal of the first switch module to the output terminal of the first switch module, and to trigger the touch control module to output a first scan signal to the electrode module through the first switch module to perform a self-capacitance scanning of a row electrode; and emits a first control signal to control the second switch control module to control to couple the first input terminal of the second switch module to the output terminal of the second switch module to transmit a row electrode signal of the electrode module to the touch control module through the first switch module and the second switch module to determine the row electrode with signal variation in the electrode module; and the logic control module further emits a second trigger signal when the electrode module finishes the self-capacitance scanning, to trigger the first switch control module to control to couple the second input terminal of the first switch module to the output terminal of the first switch module; emits a second control signal to control the touch control module to output a second scan signal to the electrode module through the first switch module to perform a mutual-capacitance scanning on the determined row electrode; and emits a third control signal to control the second switch control module to control to couple the second input terminal of the second switch module to the output terminal of the second switch module to transmit a column electrode signal of the electrode module to the touch control module through the second switch module to determine a location with signal variation in the electrode module so as to obtain a coordinate of a touch point.

Wherein, the electrode module comprises the row electrode unit and the column electrode unit, the row electrode unit comprises a plurality of row electrodes, and the column electrode unit comprises a plurality of column electrodes; the first switch module comprises a plurality of first switches, each of the first switches is correspondence with one of the row electrodes, the first switches comprise first input terminals, second input terminals and output terminals, the first input terminals are coupled to the first emitting terminal of the touch control module, respectively, the second input terminals are coupled to the second emitting terminal of the touch control module, respectively, and the output terminals are coupled to the row electrodes, respectively; and the second switch module comprises a plurality of second switches, each of the second switches is correspondence with one of the column electrodes, the second switches comprise first input terminals, second input terminals and output terminals, the first input terminals of the second switches are coupled to the first input terminals of the first switches, respectively, the second input terminals of the second switches are coupled to the column electrodes, respectively, and the output terminals of the second switches are coupled to the receiving terminal of the touch control module, respectively.

In order to solve the technique problem mentioned above, another technique solution adopted by the present application is to provide a touch control substrate, wherein the touch control substrate comprises a logic control module, a touch control module, a first switch control module, a first switch module, a second switch module, a second switch control module and an electrode module; the logic control module is coupled to the first switch control module, the touch control module and the second switch control module, respectively; the first switch module is coupled to the first switch control module, the touch control module, the second switch module and the electrode module, respectively; the second switch module is further coupled to the second switch control module, the touch control module and the electrode module; the logic control module emits a first trigger signal to trigger the first switch control module to control the first switch module to switch to a first configuration thereof, and to trigger the touch control module to output a first scan signal to the electrode module through the first switch module to perform a self-capacitance scanning of a row electrode; and emits a first control signal to control the second switch control module to control the second switch module to switch to a first configuration thereof to transmit a row electrode signal of the electrode module to the touch control module through the first switch module and the second switch module to determine the row electrode with signal variation in the electrode module; and the logic control module further emits a second trigger signal when the electrode module finishes the self-capacitance scanning, to trigger the first switch control module to control the first switch module to switch to a second configuration thereof; emits a second control signal to control the touch control module to output a second scan signal to the electrode module through the first switch module to perform a mutual-capacitance scanning on the determined row electrode; and emits a third control signal to control the second switch control module to control the second switch module to switch to a second configuration thereof to transmit a column electrode signal of the electrode module to the touch control module through the second switch module to determine a location with signal variation in the electrode module so as to obtain a coordinate of a touch point.

Wherein, the logic control module comprises a first output terminal, a second output terminal and a third output terminal, the touch control module comprises a control terminal, a first emitting terminal, a second emitting terminal and a receiving terminal, the first switch control module comprises an input terminal and an output terminal, the first switch module comprises a control terminal, a first input terminal, a second input terminal and an output terminal, the second switch module comprises a control terminal, a first input terminal, a second input terminal and an output terminal, and the second switch control module comprises an input terminal and an output terminal; the first output terminal of the logic control module is coupled to the input terminal of the first switch control module, and the output terminal of the first switch control module is coupled to the control terminal of the first switch module; the second output terminal of the logic control module is coupled to the control terminal of the touch control module, the first emitting terminal of the touch control module is coupled to the first input terminal of the first switch module, the second emitting terminal of the touch control module is coupled to the second input terminal of the first switch module, and the output terminal of the first switch module is coupled to a row electrode unit of the electrode module; the third output terminal of the logic control module is coupled to the input terminal of the second switch control module, and the output terminal of the second switch control module is coupled to the control terminal of the second switch module; and the first input terminal of the second switch module is coupled to the first input terminal of the first switch module, the second input terminal of the second switch module is coupled to a column electrode unit of the electrode module, and the output terminal of the second switch module is coupled to the receiving terminal of the touch control module.

Wherein, the electrode module comprises the row electrode unit and the column electrode unit, the row electrode unit comprises a plurality of row electrodes, and the column electrode unit comprises a plurality of column electrodes; the first switch module comprises a plurality of first switches, each of the first switches is correspondence with one of the row electrodes, the first switches comprise first input terminals, second input terminals and output terminals, the first input terminals are coupled to the first emitting terminal of the touch control module, respectively, the second terminals are coupled to the second emitting terminal of the touch control module, respectively, and the output terminals are coupled to the row electrodes, respectively; and the second switch module comprises a plurality of second switches, each of the second switches is correspondence with one of the column electrodes, the second switches comprise first input terminals, second input terminals and output terminals, the first input terminals of the second switches are coupled to the first input terminals of the first switches, respectively, the second input terminals of the second switches are coupled to the column electrodes, and the output terminals of the second switches are coupled to the receiving terminal of the touch control module, respectively.

Wherein, the logic control module emitting the first trigger signal to trigger the first switch control module to control the first switch module to switch to the first configuration thereof is that the logic control module emits the first trigger signal to trigger the first switch control module to control to couple the first input terminal of the first switch module to the output terminal of the first switch module; the logic control signal emitting the first control signal to control the second switch control module to control the second switch module to switch to the first configuration thereof is that the logic control module emits the first control signal to control to couple the first input terminal of the second switch module to the output terminal of the second switch module;

the logic control module emitting the second trigger signal when the electrode module finishes the self-capacitance scanning, to trigger the first switch control module to control the first switch module to switch to the second configuration thereof is that the logic control module emits the second trigger signal when the electrode module finishes the self-capacitance scanning, to trigger the first switch control module to control to couple the second input terminal of the first switch module to the output terminal of the first switch module; and the logic control module emitting the third control signal to control the second switch control module to control the second switch module to switch to the second configuration is that the logic control module emits the third control signal to control the second switch control module to control to couple the second input terminal of the second switch module to the output terminal of the second switch module.

In order to solve the technique problem mentioned above, the other technique solution adopted by the present application is to provide a terminal which comprises a capacitor touch panel and the touch control substrate described in any paragraph described above.

In order to solve the technique problem mentioned above, the further another technique solution adopted by the present application is to provide a method for improving touch precision of touch panel, which comprises operating a terminal in a self-capacitance mode to perform a self-capacitance scanning on a row sensor of a touch panel to obtain an information of the row sensor with signal variation; and switching the terminal to a mutual-capacitance mode after finishing the self-capacitance scanning, to perform a mutual-capacitance scanning in accordance with the information of the row sensor with signal variation to determine a coordinate of a touch point.

Wherein, the step of operating the terminal in the self-capacitance mode to perform the self-capacitance scanning on the row sensor of the touch panel to obtain the information of the row sensor with signal variation comprises operating the terminal in the self-capacitor mode to perform the self-capacitance scanning on the row sensor to determine a signal value of the row sensor; and obtaining the information of the row sensor when the signal value of the row sensor varies.

Wherein, the step of switching the terminal to the mutual-capacitance mode after finishing the self-capacitance scanning, to perform the mutual-capacitance scanning in accordance with the information of the row sensor with signal variation to determine the coordinate of the touch point comprises switching the terminal to the mutual-capacitance mode after finishing the self-capacitance scanning, to perform the mutual-capacitance scanning on the row sensor with signal variation in accordance with the information of the row sensor to determine a signal value between the row sensor and the column sensor; determining a location with signal variation in accordance with the signal value between the row sensor and the column sensor; and determining the coordinate of the touch point in accordance with the location.

Wherein, the step of switching the terminal to the mutual-capacitance mode after finishing the self-capacitance scanning, to perform the mutual-capacitance scanning on the row sensor with signal variation in accordance with the information of the row sensor to determine the signal value between the row sensor and the column sensor comprises switching the terminal to the mutual-capacitance mode after finishing the self-capacitance scanning, to sequentially perform the mutual-capacitance on a plurality of row sensors with signal variation to sequentially determine the signal value between each of the row sensors and the column sensor; and the step of determining the location with signal variation in accordance with the signal value between the row sensor and the column sensor comprises sequentially determining each of a plurality of locations with signal variation in accordance with the signal values between the row sensors and the column sensor.

Wherein, the signal value is a voltage value or a capacitance value.

The efficacy of the present application is that, different from the conventional art, the present application determines the row electrode with signal variation through performing self-capacitance scanning on the row electrodes, thereafter performs mutual-capacitance scanning on the row electrode with signal variation, and determines a coordinate of a touch point according to a location with signal variation between the row electrode and column electrode. Therefore, the present application eliminates ghost points, improves precision of locating touch points and is characterized in high scanning speed.

DETAILED DESCRIPTION OF PREFERRED EMBODIMENTS

The description made below, which is for explanation but not for limitation, provides details such as specific system architecture, interface, technique, etc. for thoroughly understanding the present application. However, those have ordinary skill in the art should know that the present application can be achieved by other embodiments without these details. In other situations, detailed description of the well-known apparatus, circuit and method are omitted so that the description of the present application would not be affected by the unnecessary details.

Figure 1:
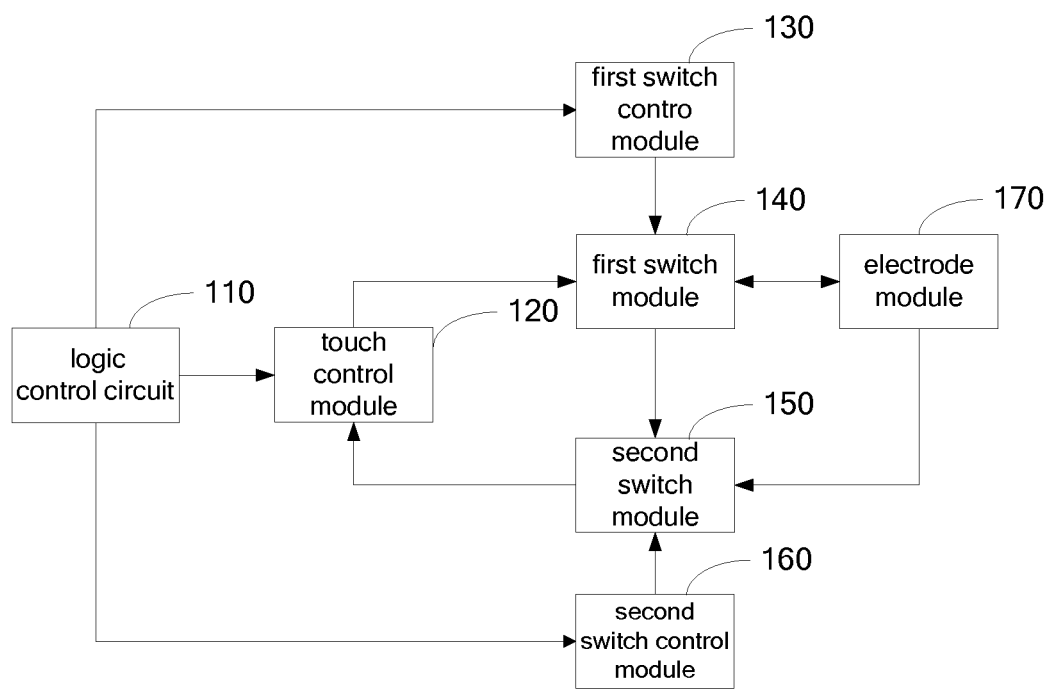
FIG. 1 is a schematic diagram of a touch control substrate according to one embodiment of the present application.

Please refer to FIG. 1, which is a schematic diagram of a touch control substrate according to one embodiment of the present application. The touch control substrate of the present application comprises a logic control module 110, a touch control module 120, a first switch control module 130, a first switch module 140, a second switch module 150, a second switch control module 160 and an electrode module 170.

The logic control module 110 is coupled to the first switch control module 130, the touch control module 120 and the second switch control module 160, respectively. The first switch module 140 is coupled to the first switch control module 130, the touch control module 120, the second switch module 150 and the electrode module 170, respectively.

The second switch module 150 is further coupled to the second switch control module 160, the touch control module 120 and the electrode module 170.

The logic control module 110 emits a first trigger signal to trigger the first switch control module 130 to control the first switch module 140 to switch to a first configuration thereof, and to trigger the touch control module 120 to output a first scan signal to the electrode module 170 through the first switch module 140 to perform a self-capacitance scanning on a row electrode; and emits a first control signal to control the second switch control module 160 to control the second switch module 150 to switch to a first configuration thereof to transmit a row electrode signal of the electrode module 170 to the touch control module 120 through the first switch module 140 and the second switch module 150 to determine the row electrode with signal variation in the electrode module 170.

The logic control module 110 further emits a second trigger signal when the electrode module 170 finishes the self-capacitance scanning, to trigger the first switch control module 130 to control the first switch module 140 to switch to a second configuration thereof; emits a second control signal to control the touch control module 120 to output a second scan signal to the electrode module 170 through the first switch module 140 to perform a mutual-capacitance scanning on the determined row electrode; and emits a third control signal to control the second switch control module 160 to control the second switch module 150 to switch to a second configuration thereof to transmit a column electrode signal of the electrode module 170 to the touch control module 120 through the second switch module 150 to determine a location with signal variation in the electrode module 170 so as to obtain a coordinate of a touch point.

Specifically, after the touch control substrate is powered, the logic control module 110 emits the first trigger signal to the first switch control module 130 and the touch control module 120 to trigger the first switch control module 130 to control the first switch module 140 to switch to the first configuration thereof so as to switch the operation mode of the touch control substrate to a self-capacitance scanning mode.

After switching the first switch module 140 to its first configuration, the touch control module 120 is triggered to output the first scan signal to the electrode module 170 through the first switch module 140 to perform the self-capacitance scanning on the row electrode. Thereafter, the logic control module 110 emits the first control signal to the second switch control module 140 to control the second switch control module 160 to emit command to the second switch module 150 to switch the second switch module 150 to its first configuration so as to make the touch control module 120 receives the row electrode signal from the electrode module 170 through the first switch module 140 and the second switch module 150 to determine the row electrode with signal variation in the electrode module 170.

Wherein, the operation mode of the touch control module comprises the self-capacitance scanning mode and a mutual-capacitance scanning mode. The first configuration of the first switch module 140 and the first configuration of the second switch module 150 are corresponding to the self-capacitance scanning mode. The second configuration of the first switch module 140 and the second configuration of the second switch module 150 are corresponding to the mutual-capacitance scanning mode.

When the touch control substrate is operated in the self-capacitance mode, the first switch module 140 and the second switch module 150 switch to the first configuration; and the touch control module 120 emits a scan signal to the row electrode of the electrode module 170 through the first switch module 140 to simultaneously scan all row electrodes, and receives all the row electrode signals through the second switch module 150 so as to sense the variations of the row electrode signals. Wherein, each variation of the row electrode signal is the variation of the self-capacitance of the row electrode signal, and the row electrode signal could be capacitance value or voltage value.

When the electrode module 170 finishes the self-capacitance scanning, the logic control module 110 emits the second trigger signal to the first switch control module 130 to trigger the first switch control module 130 to control the first switch module 140 to switch to the second configuration so as to switch the operation mode of the touch control substrate from the self-capacitance scanning mode to the mutual-capacitance scanning mode.

After switching the first switch module 140 to the second configuration, the logic control module 110 emits the second control signal and the third control signal to the touch control module 120 so that, after receiving the second control signal, the touch control module 120 outputs the second scan signal to the electrode module 170 through the first switch module 140 to perform the mutual-capacitance scanning on the determined row electrodes with signal variation; at the same time, after receiving the third control signal, the second switch control module 160 controls the second switch module 150 to switch to the second configuration to make the touch control module 120 receive the mutual-capacitance with signal variation in the electrode module 170 through the second switch 150 to determine the location with signal variation between the row electrode and the column electrode so as to obtain the coordinate of the touch point.

Wherein, when the touch control substrate is operated in the mutual-capacitance mode, the first switch module 140 switches to the second configuration, the second switch module 150 switches to the second configuration, and the touch control module 120 emits the second scan signal to the row electrode of the electrode module 170 through the first switch module 140 and receives the signal between each row electrode and column electrode through the second switch module 150 so as to sense the signal variation between each row electrode and column electrode.

It can be understood that the scan frequencies of the first scan signal and the second scan signal can be set in accordance with the requirement of users and is not limited here.

The solution described above determines the row electrode with signal variation through performing self-capacitance scanning on the row electrodes, thereafter performs mutual-capacitance scanning on the row electrode with signal variation, and determines a coordinate of a touch point according to a location with signal variation between the row electrode and column electrode. Therefore, the solution eliminates ghost points, improves precision of locating touch points and is characterized in high scanning speed.

Figure 2:
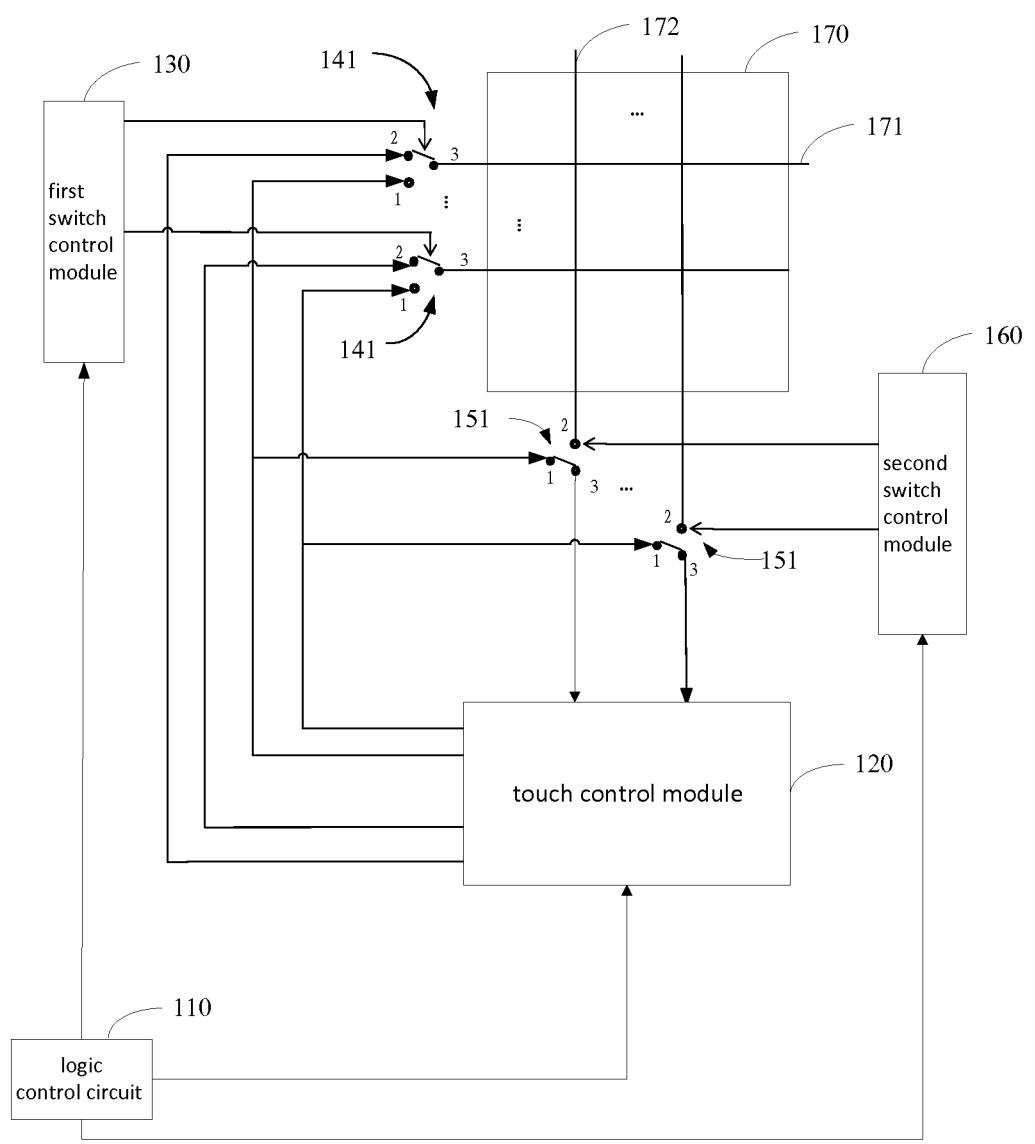
FIG. 2 is a schematic diagram of a touch control substrate according to another embodiment of the present application.

Please refer to FIG. 2, which is a schematic diagram of a touch control substrate according to another embodiment of the present application. The touch control substrate of the present application comprises a logic control module 110, a touch control module 120, a first switch control module 130, a first switch module 140, a second switch module 150, a second switch control module 160 and an electrode module 170. Wherein, the first switch module 140 comprises a plurality of first switches 141, and the second switch module 150 comprises a plurality of second switches 151. The electrode module 170 comprises a row electrode unit 171 and a column electrode unit 172, the row electrode unit 171 comprises a plurality of row electrodes, and the column electrode unit 172 comprises a plurality of column electrodes. The first switches 141 are one-by-one corresponding to the row electrodes, and the second switches 151 are one-by-one corresponding to the column electrodes.

The logic control module 110 comprises a first output terminal, a second output terminal and a third output terminal, the touch control module 120 comprises a control terminal, a first emitting terminal, a second emitting terminal and a receiving terminal, the first switch control module 130 comprises an input terminal and an output terminal, the first switch module 140 comprises a control terminal, a first input terminal 1, a second input terminal 2 and an output terminal 3, the second switch module 150 comprises a control terminal, a first input terminal 1, a second input terminal 2 and an output terminal 3, and the second switch control module 160 comprises an input terminal and an output terminal.

The first output terminal of the logic control module 110 is coupled to the input terminal of the first switch control module 130, and the output terminal of the first switch control module 130 is coupled to the control terminal of the first switch module 140.

The second output terminal of the logic control module 110 is coupled to the control terminal of the touch control module 120, the first emitting terminal of the touch control module 120 is coupled to the first input terminal 1 of the first switch module 140, the second emitting terminal of the touch control module 120 is coupled to the second input terminal 2 of the first switch module 140, and the output terminal of the first switch module 140 is coupled to the row electrode unit 171 of the electrode module 170.

The third output terminal of the logic control module 110 is coupled to the input terminal of the second switch control module 160, and the output terminal of the second switch control module 160 is coupled to the second switch module 150.

The first input terminal 1 of the second switch module 150 is coupled to the first input terminal 1 of the first switch module 140, the second input terminal 2 of the second switch module 150 is coupled to the column electrode unit 172 of the electrode module 170, and the output terminal 3 of the second switch module 150 is coupled to the receiving terminal of the touch control module 120.

Wherein, the first switch module 140 comprises a plurality of first switches 141, and each first switch 141 is correspondence with one row electrode. The first switch 141 comprises the first input terminal 1, the second input terminal 2 and the output terminal 3. The first input terminal 1 of each first switch 141 is respectively coupled to the first emitting terminal of the touch control module 120, the second input terminal 2 of each first switch 141 is respectively coupled to the second emitting terminal of the touch control module 120, and the output terminal of each first switch 141 is respectively coupled to the row electrode.

The second switch module 150 comprises a plurality of second switches 151, and each second switch 151 is correspondence with one column electrode. The second switch 151 comprises a first input terminal 1, a second input terminal 2 and an output terminal 3. The first input terminal 1 of each second switch 151 is respectively coupled to the first input terminal 1 of the first switch 141, the second input terminal 2 of each second switch 151 is respectively coupled to the column electrode, and the output terminal of each second switch 151 is respectively coupled to the receiving terminal of the touch control module 120.

The logic control module 110 emits the first trigger signal to trigger the first switch control module 130 to control to couple the first input terminal of the first switch module 140 to the output terminal of the first switch module 140, and to trigger the touch control module 120 to output the first scan signal to the electrode module 170 through the first switch module 140 to perform the self-capacitance scanning on the row electrodes; and emits the first control signal to control the second switch control module 160 to control to couple the first input terminal of the second switch module 150 to the output terminal of the second switch module to transmit the row electrode signal of the electrode module 170 to the touch control module 120 through the first switch module 140 and the second switch module 150 to determine the row electrode with signal variation in the electrode module 170.

The logic control module 110 further emits the second trigger signal when the electrode module 170 finishes the self-capacitance scanning, to trigger the first switch control module 130 to control to couple the second input terminal of the first switch module 140 to the output terminal of the first switch module 140; emits the second control signal to control the touch control module 120 to output the scan signal to the electrode module 170 through the first switch module 140 to perform mutual-capacitance scanning on the determined row electrode; and emits the third control signal to control the second switch control module 160 to control to couple the second input terminal of the second switch module 150 to the output terminal of the second switch module 150 to transmit the column electrode signal of the electrode module 170 to the touch control module 120 through the second switch module 150 to determine the location where the signal varied in the electrode module 170 so as to obtain the coordinate of the touch point.

Specifically, after the touch control substrate is powered, the logic control module emits the first trigger signal to the first switch control module 130 and the touch control module 120 to trigger the first switch control module 130 to control to couple the first input terminal 1 of each first switch 141 in the first switch module 140 to the output terminal 3 of the first switch 141 so as to switch the operation mode of the touch control substrate to the self-capacitance scanning mode.

After the first input terminal 1 of each first switch 141 in the first switch module 140 is coupled to the output terminal 3, the touch control module 120 is triggered to output the first scan signal to the electrode module 170 through the first switch module 140 to perform the self-capacitance scanning on the row electrode. Thereafter, the logic control module 110 emits the first control signal to the second switch control module 160 to control the second switch control module 160 to emit commands to the second switch module 150 to couple the first input terminal 1 of each second switch 151 in the second switch module 150 to the output terminal 3 of the second switch 151 so that the touch control module 120 could receive the row electrode signals of the electrode module 170 through the first switch module 140 and the second switch module 150 to determine the row electrode with signal variation in the electrode module 170.

Wherein, the operation mode of the touch control substrate comprises the self-capacitance scanning mode and the mutual-capacitance scanning mode. Coupling the first input terminal of the first switch module 140 to the output terminal of the first switch module 140 and coupling the first input terminal of the second switch module 150 to the output terminal of the second switch module 150 are correspondence with the self-capacitance scanning mode. Coupling the second input terminal of the first switch module 140 to the output terminal of the first switch module 140 and coupling the first input terminal of the second switch module 150 to the output terminal of the second switch module 150 are correspondence with the mutual-capacitance scanning mode.

When the touch control substrate is operated in the self-capacitance mode, the first switch module 140 is switched to the first configuration, the second switch module 150 is switched to the first configuration, and the touch control module 120 emits scan signal to the row electrodes of the electrode module 170 through the first switch module 140 to simultaneously scan all the row electrodes, and receives all the row electrode signals from the second switch module 150 to sense the variations of the row electrode signals. Wherein, each variation of the row electrode signal is a variation value of the self-capacitance of the row electrode signal, and the row electrode signal could be a capacitor value or a voltage value.

When the electrode module 170 finishes the self-capacitance scanning, the logic control module 110 emits the second trigger signal to the first switch control module 130 to trigger the first switch control module 130 to control to couple the second input terminal 2 of each first switch 141 in the first switch module 140 to the output terminal 3 of the first switch 141 so as to switch the operation mode of the touch control substrate from the self-capacitance scanning mode to the mutual-capacitance scanning mode.

After the second input terminal 2 of each first switch 141 in the first switch module 140 is coupled to the output terminal 3 of the first switch 141, the logic control module 110 emits the second control signal and the third control signal to the touch control module 120 to make the touch control module 120 output the second scan signal to the electrode module 170 through the first switch module 140 to perform the mutual-capacitance scanning on the determined row electrode with signal variation after the touch control module receives the second control signal; and, in the meanwhile, after receiving the third control signal, the second switch control module 160 controls to couple the second input terminal 2 of each second switch 151 in the second switch module 150 to the output terminal 3 of the second switch 151 to make the touch control module 120 receive the mutual-capacitance with signal variation in the electrode module 170 through the second switch 150 to determine the location with signal variation between the row electrode and the column electrode in the electrode module 170 so as to obtain the coordinate of the touch point.

Wherein, when the touch control substrate is operated in the mutual-capacitance mode, the second input terminal of the first switch module 140 is coupled to the output terminal of the first switch module 140, the second input terminal of the second switch module 150 is coupled to the output terminal of the second switch module 150, and the touch control module 120 emits the second san signal to the electrode module 170 through the first switch module 140 to sequentially scan each row electrode and receives the signal between each row electrode and column electrode through the second switch module 150 so as to sense the signal variation between each row electrode and column electrode.

It can be understood that the scan frequencies of the first scan signal and the second scan signal can be set in accordance with the requirement of users and is not limited here.

The solution described above determines the row electrode with signal variation through performing self-capacitance scanning on the row electrodes, and then performs mutual-capacitance scanning on the row electrode with signal variation, and determines a coordinate of a touch point according to a location with signal variation between the row electrode and column electrode. The solution eliminates ghost points, improves precision of locating touch points and is characterized in high scanning speed.

The present application further provides a terminal, the terminal comprises a capacitance touch panel and the touch control substrate described in the above embodiments. Please refer to the above embodiments for the details which are not described again here.

Figure 3:
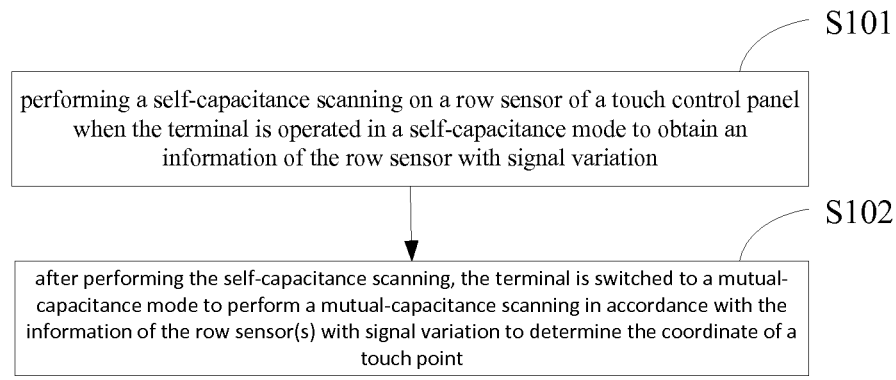
FIG. 3 is a flow chart of a method for improving touch precision according to one embodiment of the present application.

Please refer to FIG. 3, which is a flow chart of a method for improving touch precision according to one embodiment of the present application. The embodiment is performed by a terminal. The method for improving touch precision of the touch panel of the present embodiment comprises the following steps:

S101: performing a self-capacitance scanning on a row sensor of a touch control panel when the terminal is operated in a self-capacitance mode to obtain an information of the row sensor with signal variation.

When the terminal is operated in the self-capacitance mode, the terminal emits a first scan signal to the row sensor, perform a self-capacitance scanning on the row sensor in the touch control panel to simultaneously determine a capacitance value or a voltage value of the self-capacitance of each row sensor in the touch control panel to obtain the information of row sensors with capacitance value variation or voltage value variation. Wherein, determining the self-capacitance is to determine the capacitance value or voltage value of the self-capacitance of the row sensor, and the information of the row sensor is a coordinate of the row sensor. The coordinate of the row sensor is for determining the row where a signal of the row sensor varies.

S102: after performing the self-capacitance scanning, the terminal is switched to a mutual-capacitance mode to perform a mutual-capacitance scanning in accordance with the information of the row sensor(s) with signal variation to determine the coordinate of a touch point.

After finishing the self-capacitance determination, the terminal is switched to the mutual-capacitance mode. The terminal emits a second scan signal to the row sensors with signal variation in accordance with the information of the row sensor with signal variation in order to perform the mutual-capacitance scanning on the row sensor with capacitance value variation or voltage value variation to determine a location with signal variation between the row sensor, whose capacitance value or voltage value varies, and the column sensor. When the terminal determines the location with signal variation, the coordinate of the location is obtained so as to determine the coordinate to be the coordinate of the touch point.

For example, when the terminal performs the self-capacitance scanning on the row sensors and determines that the capacitance value or the voltage value of the row sensors in a $1^{st}$ row and a $5^{th}$ row varies, the terminal would perform mutual-capacitance scanning on the row sensors in the $1^{st}$ row and the $5^{th}$ row in the mutual-capacitance mode, respectively, to determine the locations with signal variation between the row sensors in the $1^{st}$ row and the $5^{th}$ row and all the column sensors.

In the embodiment, the scan frequencies of the first scan signal and the second scan signal can be set in accordance with the requirement of users and is not limited here.

The solution described above obtains an information of the row sensor with signal variation through performing self-capacitance scanning on the row sensors in the touch control panel, and then performs mutual-capacitance scanning on the information of the row sensor with signal variation so as to determine a coordinate of a touch point. The solution is capable of eliminating ghost points and improving precision of locating touch points, and is characterized in high scanning speed.

Figure 4:
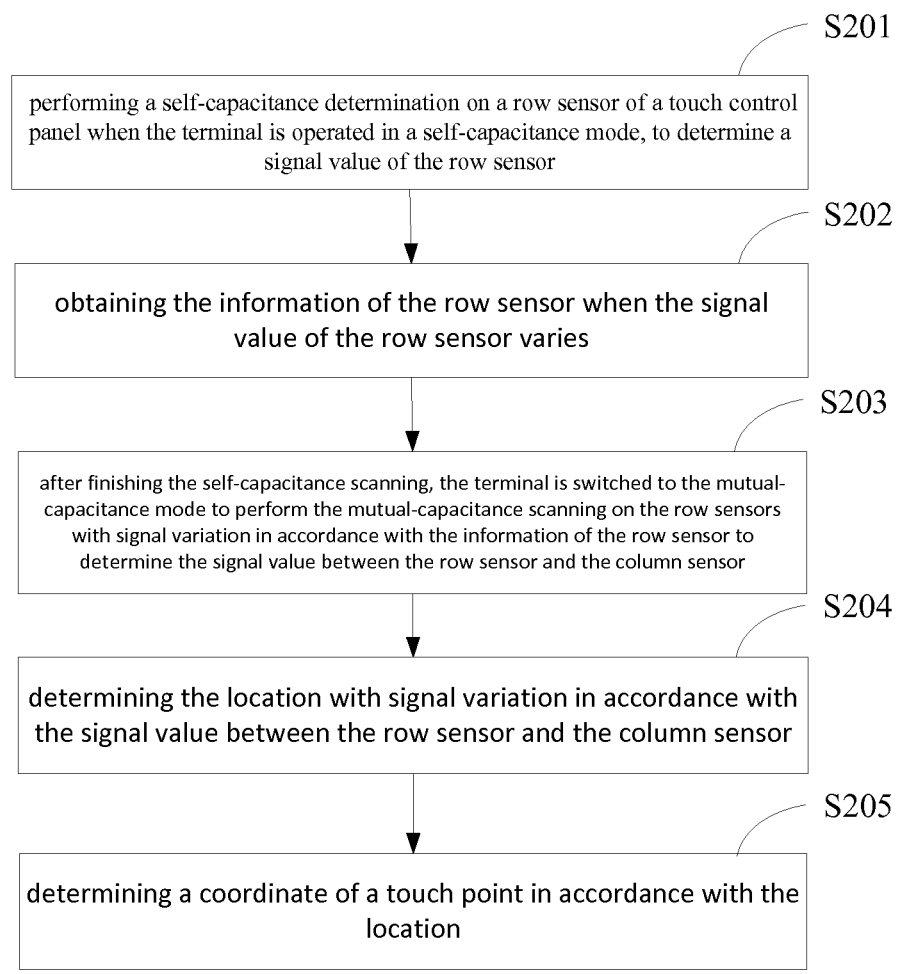
FIG. 4 is a flow chart of a method for improving touch precision according to another embodiment of the present application.

Please refer to FIG. 4, which is a flow chart of a method for improving touch precision according to another embodiment of the present application. The embodiment is performed by a terminal. The method for improving touch precision of the touch panel of the present embodiment comprises the following steps:

S201: performing a self-capacitance determination on a row sensor of a touch control panel when the terminal is operated in a self-capacitance mode, to determine a signal value of the row sensor.

The terminal is operated in the self-capacitance mode and emits a first scan signal to the row sensor in order to perform a self-capacitance scanning on the row sensor in the touch control panel so as to determine a capacitance value or a voltage value of the self-capacitance of each row sensor in the touch control panel. Wherein, the self-capacitance determination is to determine the capacitance value or the voltage value of the self-capacitance of the row sensor.

Step S202 is performed when the signal value of the row sensor varies, or, otherwise, step S201 is performed continuously.

S202: obtaining the information of the row sensor when the signal value of the row sensor varies.

When variation of the capacitance value or the voltage value of the self-capacitance of any row sensor is determined, the information of the row sensor with capacitance value variation or voltage value variation is obtained. Wherein, the information of the row sensor is the coordinate of the row sensor. The coordinate of the row sensor is for determining the row where a signal of the row sensor varies.

S203: after finishing the self-capacitance scanning, the terminal is switched to the mutual-capacitance mode to perform the mutual-capacitance scanning on the row sensors with signal variation in accordance with the information of the row sensor to determine the signal value between the row sensor and the column sensor.

After finishing the self-capacitance scanning, the terminal is switched from the self-capacitance mode to the mutual-capacitance mode, and the terminal emits a second scan signal to the row sensors with capacitance value variation or voltage value variation in accordance with the obtained information of the row sensor in order to determine the signal value between each row sensor, whose capacitance value or voltage value varies, and column sensor. The signal value is a capacitance value or a voltage value.

S204: determining the location with signal variation in accordance with the signal value between the row sensor and the column sensor.

The terminal sequentially determines the location with signal variation between each row sensor with signal variation and the column sensors in accordance with the signal value between the row sensors and the column sensors.

S205: determining a coordinate of a touch point in accordance with the location.

When the terminal determines the locations where signal variations occur between the row sensors and the column sensors, the coordinates of the locations are obtained so that the terminal sequentially determines the coordinates of the touch points sequentially in accordance with the coordinates of the locations where the signal variations occur between the row sensors and the column sensors.

In the embodiment, the scan frequencies of the first scan signal and the second scan signal can be set in accordance with the requirement of users and is not limited here.

The solution described above obtains an information of the row sensor with signal variation through performing self-capacitance scanning on the row sensors in the touch control panel, and then performs mutual-capacitance scanning on the information of the row sensor with signal variation so as to determine a coordinate of a touch point. The solution is capable of eliminating ghost points and improving precision of locating touch points, and is characterized in high scanning speed.

The description made above, which is for explanation but not for limitation, provides details such as specific system architecture, interface, technique, etc. for thoroughly understanding the present application. However, those have ordinary skill in the art should know that the present application can be achieved by other embodiments without these specific details. In other situations, detailed description of the well-known apparatus, circuit and method are omitted so that the description of the present application would not be affected by the unnecessary details.

What is claimed is:

1. A touch control substrate comprising a logic control module, a touch control module, a first switch control module, a first switch module, a second switch module, a second switch control module and an electrode module;

wherein, the logic control module comprises a first output terminal, a second output terminal and a third output terminal, the touch control module comprises a control terminal, a first emitting terminal, a second emitting terminal and a receiving terminal, the first switch control module comprises an input terminal and an output terminal, the first switch module comprises a control terminal, a first input terminal, a second input terminal and an output terminal, the second switch module comprises a control terminal, a first input terminal, a second input terminal and an output terminal, the second switch control module comprises an input terminal and an output terminal;

the first output terminal of the logic control module is coupled to the input terminal of the first switch control module, and the output terminal of the first switch control module is coupled to the control terminal of the first switch module;

the second output terminal of the logic control module is coupled to the control terminal of the touch control module, the first emitting terminal of the touch control module is coupled to the first input terminal of the first switch module, the second emitting terminal of the touch control module is coupled to the second input terminal of the first switch module, and the output terminal of the first switch module is coupled to a row electrode unit of the electrode module;

the third output terminal of the logic control module is coupled to the input terminal of the second switch control module, and the output terminal of the second switch control module is coupled to the control terminal of the second switch module;

the first input terminal of the second switch module is coupled to the first input terminal of the first switch module, the second input terminal of the second switch module is coupled to a column electrode unit of the electrode module, and output terminal of the second switch module is coupled to the receiving terminal of the touch control module;

the logic control module emits a first trigger signal to trigger the first switch control module to control to couple the first input terminal of the first switch module to the output terminal of the first switch module, and to trigger the touch control module to output a first scan signal to the electrode module through the first switch module to perform a self-capacitance scanning of a row electrode; and emits a first control signal to control the second switch control module to control to couple the first input terminal of the second switch module to the output terminal of the second switch module to transmit a row electrode signal of the electrode module to the touch control module through the first switch module and the second switch module to determine the row electrode with signal variation in the electrode module; and the logic control module further emits a second trigger signal when the electrode module finishes the self-capacitance scanning, to trigger the first switch control module to control to couple the second input terminal of the first switch module to the output terminal of the first switch module; emits a second control signal to control the touch control module to output a second scan signal to the electrode module through the first switch module to perform a mutual-capacitance scanning on the determined row electrode; and emits a third control signal to control the second switch control module to control to couple the second input terminal of the second switch module to the output terminal of the second switch module to transmit a column electrode signal of the electrode module to the touch control module through the second switch module to determine a location with signal variation in the electrode module so as to obtain a coordinate of a touch point.

2. The touch control substrate according to claim 1, wherein the electrode module comprises the row electrode unit and the column electrode unit, the row electrode unit comprises a plurality of row electrodes, and the column electrode unit comprises a plurality of column electrodes;

the first switch module comprises a plurality of first switches, each of the first switches is correspondence with one of the row electrodes, the first switches comprise first input terminals, second input terminals and output terminals, the first input terminals are coupled to the first emitting terminal of the touch control module, respectively, the second input terminals are coupled to the second emitting terminal of the touch control module, respectively, and the output terminals are coupled to the row electrodes, respectively; and the second switch module comprises a plurality of second switches, each of the second switches is correspondence with one of the column electrodes, the second switches comprise first input terminals, second input terminals and output terminals, the first input terminals of the second switches are coupled to the first input terminals of the first switches, respectively, the second input terminals of the second switches are coupled to the column electrodes, respectively, and the output terminals of the second switches are coupled to the receiving terminal of the touch control module, respectively.

3. A terminal comprising a capacitance touch panel and the touch control substrate of claim 2.

4. A terminal comprising a capacitance touch panel and the touch control substrate of claim 1.

5. A touch control substrate, wherein the touch control substrate comprises a logic control module, a touch control module, a first switch control module, a first switch module, a second switch module, a second switch control module and an electrode module;

the logic control module is coupled to the first switch control module, the touch control module and the second switch control module, respectively; the first switch module is coupled to the first switch control module, the touch control module, the second switch module and the electrode module, respectively;

the second switch module is further coupled to the second switch control module, the touch control module and the electrode module;

the logic control module emits a first trigger signal to trigger the first switch control module to control the first switch module to switch to a first configuration thereof, and to trigger the touch control module to output a first scan signal to the electrode module through the first switch module to perform a self-capacitance scanning of a row electrode; and emits a first control signal to control the second switch control module to control the second switch module to switch to a first configuration thereof to transmit a row electrode signal of the electrode module to the touch control module through the first switch module and the second switch module to determine the row electrode with signal variation in the electrode module; and the logic control module further emits a second trigger signal when the electrode module finishes the self-capacitance scanning, to trigger the first switch control module to control the first switch module to switch to a second configuration thereof; emits a second control signal to control the touch control module to output a second scan signal to the electrode module through the first switch module to perform a mutual-capacitance scanning on the determined row electrode; and emits a third control signal to control the second switch control module to control the second switch module to switch to a second configuration thereof to transmit a column electrode signal of the electrode module to the touch control module through the second switch module to determine a location with signal variation in the electrode module so as to obtain a coordinate of a touch point.

6. The touch control substrate according to claim 5, wherein the logic control module comprises a first output terminal, a second output terminal and a third output terminal, the touch control module comprises a control terminal, a first emitting terminal, a second emitting terminal and a receiving terminal, the first switch control module comprises an input terminal and an output terminal, the first switch module comprises a control terminal, a first input terminal, a second input terminal and an output terminal, the second switch module comprises a control terminal, a first input terminal, a second input terminal and an output terminal, and the second switch control module comprises an input terminal and an output terminal;

the first output terminal of the logic control module is coupled to the input terminal of the first switch control module, and the output terminal of the first switch control module is coupled to the control terminal of the first switch module;

the second output terminal of the logic control module is coupled to the control terminal of the touch control module, the first emitting terminal of the touch control module is coupled to the first input terminal of the first switch module, the second emitting terminal of the touch control module is coupled to the second input terminal of the first switch module, and the output terminal of the first switch module is coupled to a row electrode unit of the electrode module;

the third output terminal of the logic control module is coupled to the input terminal of the second switch control module, and the output terminal of the second switch control module is coupled to the control terminal of the second switch module; and the first input terminal of the second switch module is coupled to the first input terminal of the first switch module, the second input terminal of the second switch module is coupled to a column electrode unit of the electrode module, and the output terminal of the second switch module is coupled to the receiving terminal of the touch control module.

7. A terminal comprising a capacitance touch panel and the touch control substrate of claim 6.

8. The touch control substrate according to claim 5, wherein the electrode module comprises the row electrode unit and the column electrode unit, the row electrode unit comprises a plurality of row electrodes, and the column electrode unit comprises a plurality of column electrodes;

the first switch module comprises a plurality of first switches, each of the first switches is correspondence with one of the row electrodes, the first switches comprise first input terminals, second input terminals and output terminals, the first input terminals are coupled to the first emitting terminal of the touch control module, respectively, the second terminals are coupled to the second emitting terminal of the touch control module, respectively, and the output terminals are coupled to the row electrodes, respectively; and the second switch module comprises a plurality of second switches, each of the second switches is correspondence with one of the column electrodes, the second switches comprise first input terminals, second input terminals and output terminals, the first input terminals of the second switches are coupled to the first input terminals of the first switches, respectively, the second input terminals of the second switches are coupled to the column electrodes, and the output terminals of the second switches are coupled to the receiving terminal of the touch control module, respectively.

9. The touch control substrate according to claim 5, wherein the logic control module emitting the first trigger signal to trigger the first switch control module to control the first switch module to switch to the first configuration thereof comprises:

the logic control module emits the first trigger signal to trigger the first switch control module to control to couple the first input terminal of the first switch module to the output terminal of the first switch module;

the logic control signal emitting the first control signal to control the second switch control module to control the second switch module to switch to the first configuration thereof comprises:

the logic control module emits the first control signal to control to couple the first input terminal of the second switch module to the output terminal of the second switch module;

the logic control module emitting the second trigger signal when the electrode module finishes the self-capacitance scanning, to trigger the first switch control module to control the first switch module to switch to the second configuration thereof comprises:

the logic control module emits the second trigger signal when the electrode module finishes the self-capacitance scanning, to trigger the first switch control module to control to couple the second input terminal of the first switch module to the output terminal of the first switch module; and the logic control module emitting the third control signal to control the second switch control module to control the second switch module to switch to the second configuration comprises:

the logic control module emits the third control signal to control the second switch control module to control to couple the second input terminal of the second switch module to the output terminal of the second switch module.

10. A terminal comprising a capacitance touch panel and the touch control substrate of claim 5.

* * * * *